United States Patent [19]

Richardson et al.

[11] Patent Number: 5,685,203
[45] Date of Patent: Nov. 11, 1997

[54] COMPRESSOR RUNNING GEAR

[75] Inventors: Russell D. Richardson; Rick G. Tatum, both of Mooresville, N.C.

[73] Assignee: Ingersoll-Rand Company, Woodcliff Lake, N.J.

[21] Appl. No.: 566,379

[22] Filed: Dec. 1, 1995

[51] Int. Cl.$^6$ .............................. F16C 35/07; F02F 7/00
[52] U.S. Cl. .......................... 74/595; 92/147; 464/178; 123/195 C; 74/598
[58] Field of Search ..................... 74/595, 596, 597, 74/598; 92/147; 464/170, 178; 123/195 C

[56] References Cited

U.S. PATENT DOCUMENTS

| | | |
|---|---|---|
| 891,803 | 6/1908 | Joy . |
| 1,299,709 | 4/1919 | Hall ............................ 92/147 X |
| 1,427,555 | 8/1922 | Shepard ........................ 74/596 X |
| 1,624,228 | 4/1927 | Ford ............................ 74/597 |
| 1,646,931 | 10/1927 | Robinson . |
| 1,868,377 | 7/1932 | Birkigt . |
| 2,019,657 | 11/1935 | Church ........................ 464/170 X |
| 2,027,940 | 1/1936 | Vincent . |
| 2,129,906 | 9/1938 | Brill ............................ 92/147 |
| 4,109,622 | 8/1978 | Fujikawa et al. ............. 74/597 X |
| 4,674,455 | 6/1987 | Tsuboi . |
| 4,773,366 | 9/1988 | Seidl et al. . |
| 4,958,602 | 9/1990 | Hoppner et al. .............. 123/195 C |
| 5,042,319 | 8/1991 | Hobock et al. . |
| 5,150,676 | 9/1992 | Brevick et al. . |

Primary Examiner—Charles A. Marmor
Assistant Examiner—Mary Ann Battista
Attorney, Agent, or Firm—Michael M. Gnibus

[57] ABSTRACT

A compressor running gear and method for assembling the running gear. The running gear includes a split housing having a first housing portion having a first wall and a second wall. Each wall includes at least one shoulder and a shroud. The split housing also includes a second housing portion adapted to be mated with the first housing portion, the first and second housing portions together define a housing chamber. The running gear also includes a crank assembly located in the housing chamber. The crank assembly includes first and second bearing carriers which are mounted on a crankshaft. Each of the bearing carriers has at least one arm adapted to be seated on the at least one shoulder.

4 Claims, 4 Drawing Sheets

COMPRESSOR RUNNING GEAR

BACKGROUND OF THE INVENTION

This invention generally relates to running gears for fluid compressors where the running gear is comprised of a crank assembly located in a housing. More particularly, the invention relates to fluid compressor running gears which have a first housing portion, a crank assembly adapted to be supported by the first housing portion, and a second housing portion adapted to be mated with the first housing portion to form a housing that substantially encloses the crank assembly.

Generally, reciprocating compressors include a running gear which drives at least one piston in a reciprocating manner through a piston cylinder. Typical running gears are comprised of a crank assembly that is enclosed in a running gear housing. The crank assembly generally includes a shaft with one or more piston connecting arms and shaft bearings mounted on the shaft. The housing defines an interior chamber that is adapted to receive the crank assembly. The housing is unitary and is substantially closed except for an opening formed in one housing end. The opening is provided in order to permit the crank assembly to be located in the housing chamber when the running gear is assembled.

The crank assembly is assembled by mounting one or more piston connecting arms and one or more crankshaft support bearings along the length of the crankshaft. The complete crank assembly is then located in the housing chamber through the opening in the housing end. Since the connecting arms are typically quite long, the opening in the housing end is usually too small to permit the crank assembly to be moved directly into the housing chamber along a straight path. Rather, in order to locate the crank assembly in the housing, the crank assembly must be angled downward or "dipped" toward the open housing end and guided into the chamber. The crank assembly is located in the housing chamber in this manner by lowering one end of the crankshaft relative to the remainder of the crank assembly and then moving the lowered crankshaft end into the housing chamber followed by the remaining portion of the crank assembly. Because the crank assembly is too heavy to be lifted manually, a small crane or other conventional lifting apparatus is used to support the assembly.

Locating the crank assembly in the running gear housing in this manner can be difficult and can damage the crank assembly. As the crank assembly is located in the housing, the connecting arms frequently come in contact with the housing and as a result are bent or otherwise damaged. The crank assembly may sway or otherwise move at the end of the lifting apparatus as the assembly is moved and as a result may impact the housing damaging the assembly. The bent or otherwise damaged connecting arms will produce piston misalignment which in turn will produce significant damage to the compressor. It is important that each piston be aligned properly because any misalignment, no matter how small, can produce substantial compressor damage.

In order to locate the crank assembly in the chamber without bending or otherwise damaging the connecting arms or other assembly components, the size of the housing and housing opening may be increased in order to accommodate the relatively long connecting arms and permit the assembly to be inserted through the opening without impacting the housing. Ideally, the housing should be just large enough to enclose the crank assembly. The size of the housing should be dictated by the size of the crank assembly not the length of the connecting arms. By increasing the size of the housing, it logically follows that the size, weight, and cost of the running gear will also increase. Moreover, increasing the size of the housing and running gear will negatively affect the portability of the compressor.

In an effort to overcome the foregoing shortcomings associated with known running gear assembly methods, the connecting arms may be divided into two or more discrete connecting arm segments. A first connecting arm segment is mounted along the shaft and has a length which permits the assembly to be located in the housing without having to dip the assembly. The other discrete segments which comprise the complete connecting arm are disconnected from the first arm segment before the crank assembly is located in the housing chamber. After the crank has been located in the chamber, each of the other connecting arm segments is connected to form the complete connecting arm. Segmenting the connecting arms in this manner helps to limit the size of the running gear housing and simplifies assembly of the running gear. However, disconnecting and reconnecting the arm segments in this manner will frequently produce piston misalignment.

The foregoing illustrates limitations known to exist in present running gears and running gear assembly methods. Thus, it is apparent that it would be advantageous to provide an alternative which allows the compressor running gear to be assembled so that damage to the crank assembly and resultant piston misalignment are greatly reduced. Accordingly, a suitable alternative is provided including features more fully disclosed hereinafter.

SUMMARY OF THE INVENTION

In one aspect of the present invention, this is accomplished by providing a running gear for a compressor, where the running gear includes a split housing. The split housing includes a first housing portion having a first wall and a second wall, each wall includes at least one shoulder and a shroud. The split housing also includes a second housing portion adapted to be mated with the first housing portion, the first and second housing portions together define a housing chamber.

The running gear also includes a crank assembly adapted to be located in the housing chamber, the crank assembly includes a shaft having a first shaft end and a second shaft end. A first bearing carrier is mounted on the shaft between the shaft ends, and has at least one arm. Each of the at least one arms is adapted to be located on one of the at least one shoulders in the first wall. The crank assembly also includes a second bearing carrier mounted on the shaft between the shaft ends and the second bearing carrier has at least one arm adapted to be located on one of the at least one shoulders in the second wall.

The running gear is assembled by first moving the crank assembly towards the first housing portion until each of the at least one arms of the bearing carriers is located on the at least one shoulder of the housing walls; and then mating the second housing portion with the first housing portion to substantially enclose the crank assembly.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
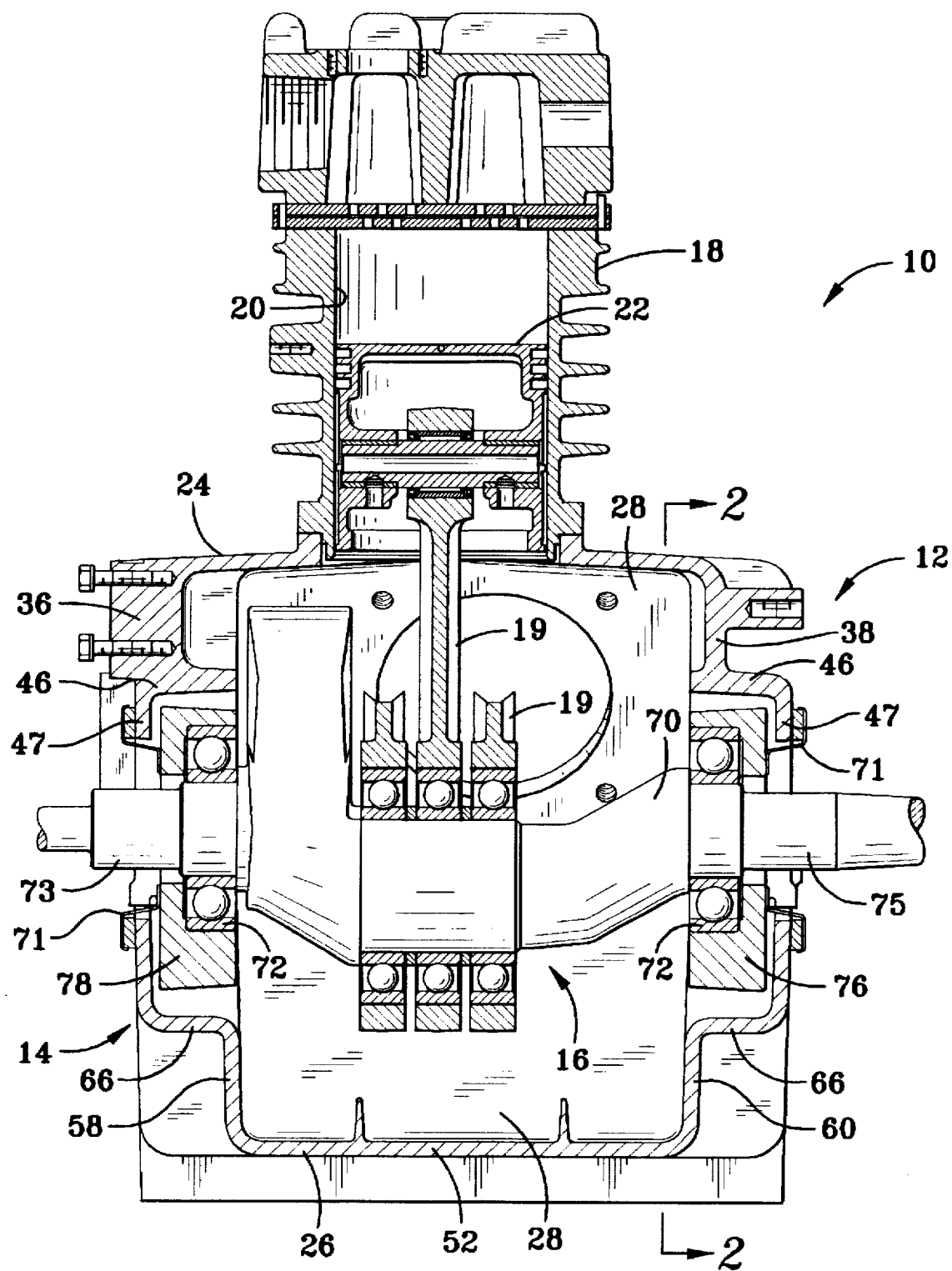
FIG. 1 is a longitudinal sectional view of the running gear of the present invention.

Referring now to the drawings, wherein similar reference characters designate corresponding parts throughout the several views, FIG. 1 shows a reciprocating compressor indicated generally at 10. The compressor includes a running gear 12 comprised of housing 14 and crank assembly 16 substantially enclosed by the housing. At least one piston cylinder 18 is mounted on the outside of the housing and defines a piston chamber 20 which is adapted to receive a piston member 22 for reciprocating movement in the chamber, in a manner that is well known in the art.

Housing 14 of running gear 12 is a split housing comprised of a first housing portion 24 and a second housing portion 26 which are adapted to be mated. When the two portions are mated they define an interior housing chamber 27 that is adapted to receive and substantially enclose crank assembly 16 as shown in FIG. 1. Although split housing 14 as disclosed is comprised of two discrete housing portions, it is contemplated that the housing may be comprised of any number of discrete housing portions.

Figure 3:
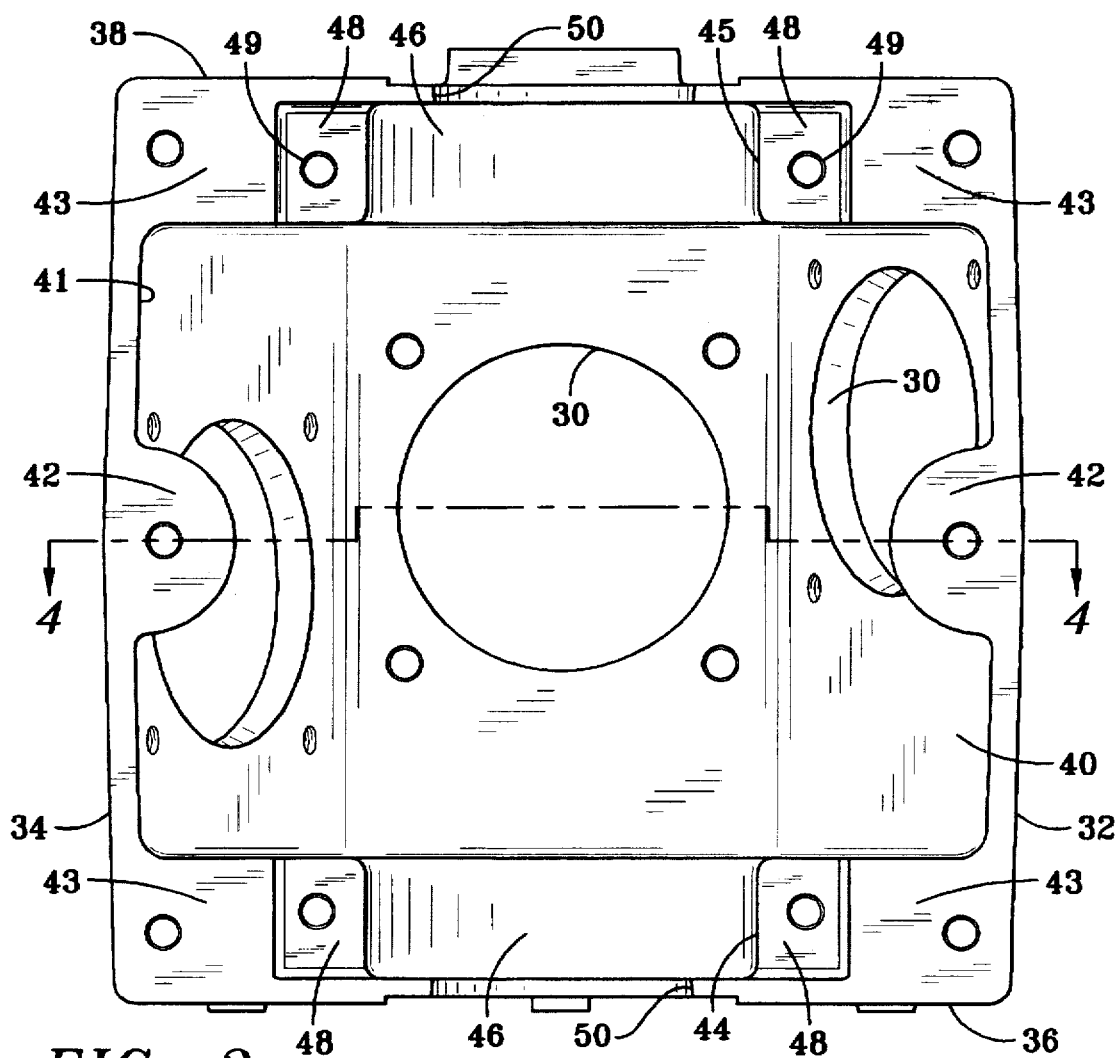
FIG. 3 is a bottom view of the first portion of the split housing of the running gear of the present invention.
Figure 4:
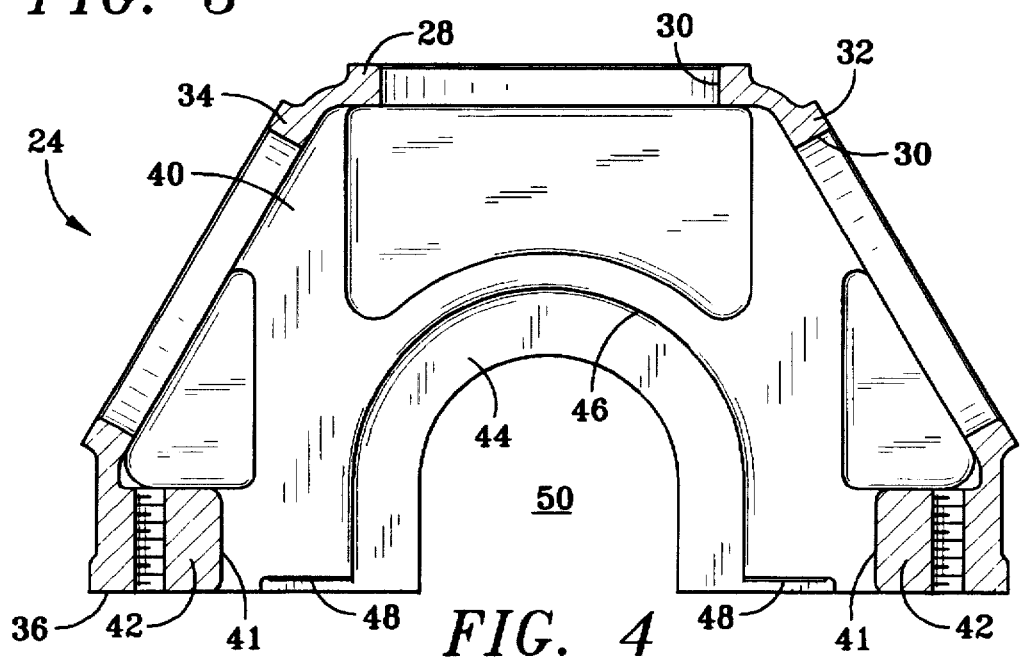
FIG. 4 is a sectional view taken along line 4—4 of FIG. 3.

Referring now to FIGS. 3 and 4, first housing portion 24 includes longitudinally extending first, second, and third walls 28, 32, and 34 respectively. Each wall includes an opening 30 which permits displacement of connecting arms 19 through housing walls 28, 32 and 43 during operation of compressor 10.

As shown in FIG. 4, walls 32 and 34 have a portion that extends downwardly away from the wall 28 at about a forty-five degree angle relative to the wall 28, and a second portion that is essentially vertical relative to the wall 28. Housing portion 24 also includes first and second laterally extending walls 36 and 38. The longitudinal walls 28, 32, and 34 and lateral walls 36 and 38 define a first housing interior 40. As shown in FIG. 3, the housing portion 24 includes an open mouth 41 which provides access to the housing interior 40.

Housing portion 24 includes flange members 42 and 43 which are made integral with housing portion 24 at the mouth 41 of the first housing portion. Each flange member includes an opening that is adapted to receive a bolt or other conventional connection member in order to join the first and second housing portions together after the housing portions 24 and 26 have been mated.

Bearing housing seats 44 and 45 are formed in lateral housing walls 36 and 38 respectively. As shown in FIG. 4, each bearing housing seat includes at least one shoulder 48. In the preferred embodiment, two shoulders 48 are disclosed. The shoulders are joined by a U-shaped shroud 46. Each shroud has a substantially L-shaped cross-section as shown in FIG. 1, and includes a lip 47 that is directed generally towards mouth 41. Openings 49, adapted to receive conventional connection members, are formed in shoulders 48. The shroud and shoulders of bearing housing seat 44 extend substantially into the housing interior 40 while the shroud and shoulders of bearing housing seat 45 extend substantially outside the housing interior. An opening 50 is formed in each shroud 46 to permit the ends of the crankshaft to extend through the housing.

Although the shroud is disclosed as being U-shaped, it is contemplated that the shroud may be any shape necessary to enclose a bearing carrier. Also, it is contemplated that any number of shoulders may be formed in the walls and the invention should not be limited to the two shoulders disclosed herein.

Second housing portion 26 is adapted to be mated with first housing portion 24 in the manner shown in FIG. 1, and includes a longitudinally extending base 52, longitudinal walls 54 and 56, and lateral walls 58 and 60. The base, and walls define a second housing portion interior 64. Like first housing portion 24, the second housing portion includes an open mouth 65. The mouths 41 and 65 are in direct communication when the housing portions are mated.

Housing portion 26 includes flanges 62 and 63 like flanges 42 and 43. Flanges 62 and 63 are made integral with housing portion 26 at the mouth 65 of the second housing portion. The flanges 62 and 42, and flanges 63 and 43 are in abutment when the two housing portions are mated. See generally FIG. 2. Access recesses 67 are included outwardly adjacent each opening in flanges 63 and 62 to accommodate a tool for tightening the connection members during assembly of the running gear.

Figure 5:
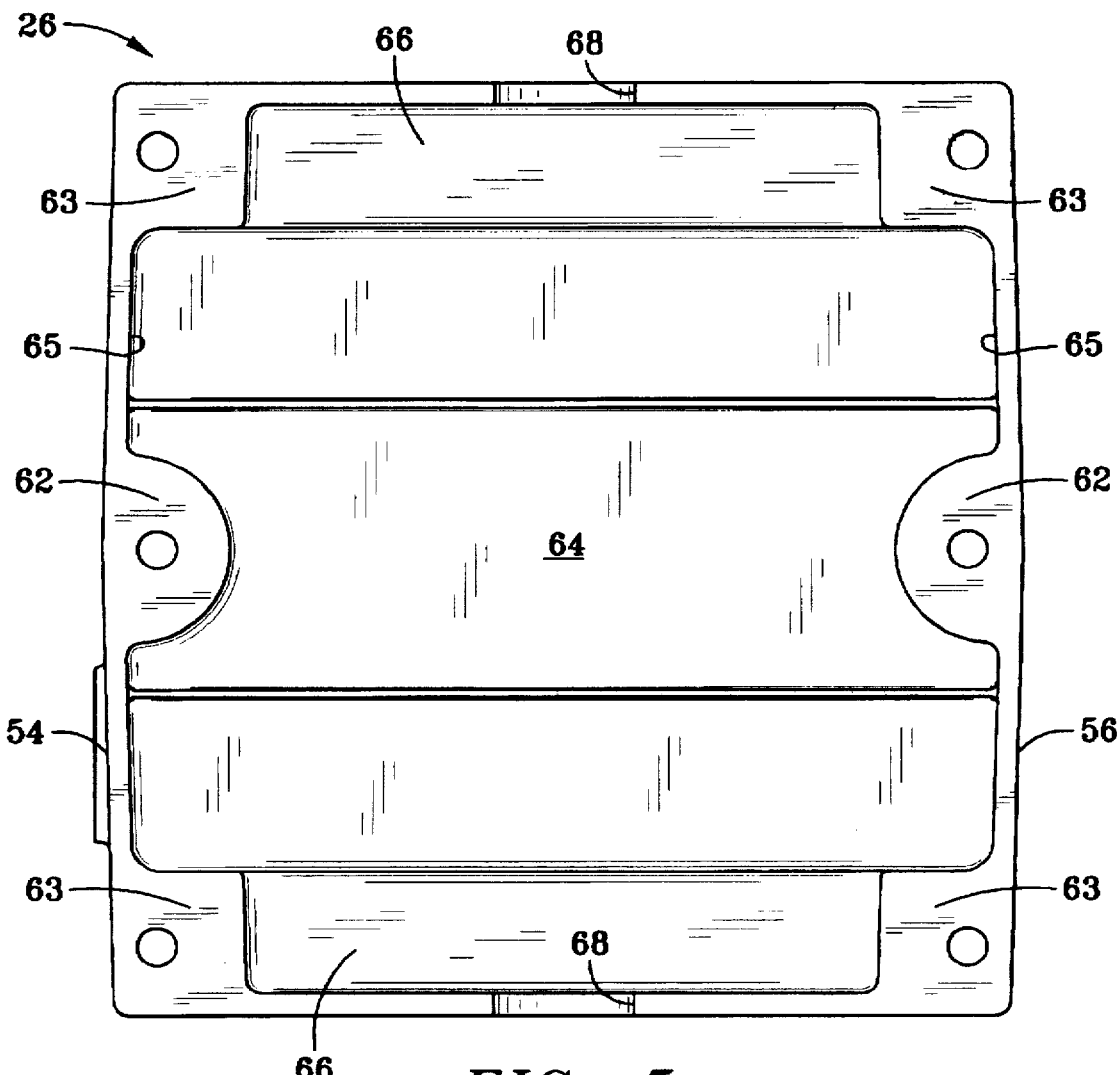
FIG. 5 is a top view of the second portion of the split housing of the running gear of the present invention.
Figure 6:
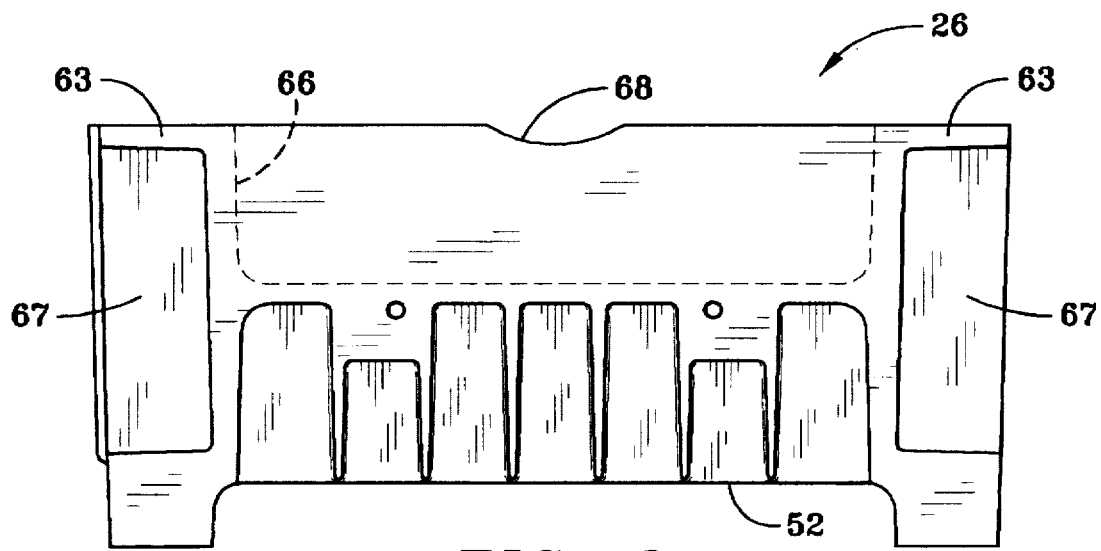
FIG. 6 is a lateral side view of the second housing portion of FIG. 5.

A shroud 66 is formed in each lateral wall 58 and 60 and extends away from housing interior 64. An arcuate groove 68 shown in FIGS. 5 and 6 is formed in the top of one side of the shroud.

Figure 2:
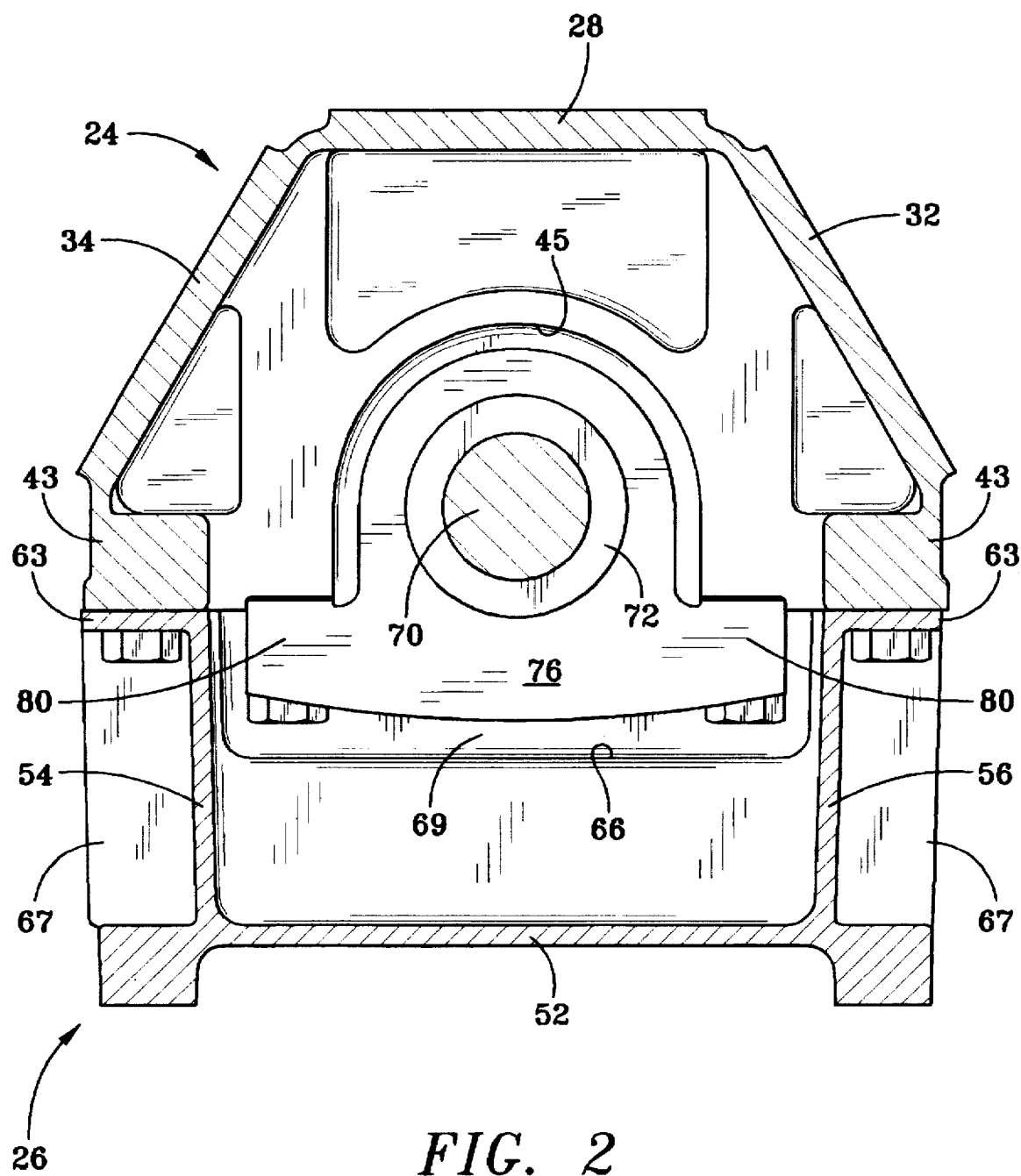
FIG. 2 is a lateral sectional view of the running gear of the present invention taken along line 2—2 of FIG. 1.

When the first and second housing portions are mated, shroud 66 and the respective bearing housing seat form a bearing housing recess 69 shown in FIG. 2.

A cap 71 is located in opening 50 and groove 68 to substantially close the lateral sides of the housing 14.

Crank assembly 16 includes a crankshaft 70 having first and second ends 73 and 75 which extend out of the housing through openings 50 and are supported by conventional bearings 72. The bearings may be any suitable conventional bearing including roller bearings or the like.

The bearings in turn are located in bearing carriers 76 and 78. For purposes of the disclosure of the preferred embodiment, the bearing carriers are of the type referred to in the art as pillowblock housings however any suitable bearing carrier may be used. Each bearing carrier has at least one arm 80 that extends away from the bearing carrier body. In the preferred embodiment, the bearing carrier includes a pair of arms 80. Each arm 80 is adapted to be located against a shoulder 48 in the manner shown in FIG. 2. The contour of the bearing carrier is substantially similar to the perimeter of the housing recess 69.

Three connecting arms 19 are mounted along the length of the crankshaft and extend radially away from shaft 70 so that a portion of each connecting arm passes through an opening 30. A piston member 22 is connected to the end of each connecting arm by a pin, shaft or other conventional means so that the connecting arm is able to move the respective piston in a reciprocating manner in the respective combustion chamber 20 defined by the corresponding piston cylinder 18 mounted on the outside of first housing portion 24.

Assembly of the running gear 12 will now be described. During assembly of the running gear, the first housing portion is inverted 180 degrees about axis 90 from the operating orientation shown in FIG. 1 so that the mouth is in a crank assembly receiving orientation. While the housing portion is inverted, it is fixedly supported by fixtures that are well known to one skilled in the art.

The crank assembly is assembled by first mounting each of the connecting arms 19 on the crankshaft 70 in the required location along the shaft. After bearings 72 have been located in bearing carriers 76 and 78 the bearing carriers 76 are mounted on the crankshaft adjacent the shaft ends.

The crank assembly may be supported at the ends either manually by two or more assembly technicians or by a small lifting apparatus such as a small crane. The crank assembly is moved towards mouth 41 of the housing 24. As the crank assembly is moved, the connecting arms 19 are directed towards housing portion 24, and the bearing carriers are also directed towards the housing portion 24. As the crank assembly is moved through mouth 41 and into the housing interior 40, the ends of the connecting arms are guided through openings 30, arms 80 are located on shoulders 48 and the bearing carrier body is substantially enclosed by the shroud 46 of bearing support seat 44. By locating the crank assembly in the first housing portion in this manner it is not necessary to dip the assembly nor is it necessary to segment the connecting arms. In this way, bending of the connecting arms, other damage to the crank assembly, and piston misalignment are greatly reduced.

The arms 80 are then bolted or otherwise connected to the shoulders.

The second housing portion 26 is then mated with the first housing portion 24 to together form chamber 27, and recess 69 which substantially enclose the crank assembly 16 and bearing carriers 76 and 78. The mated housing portions are then bolted together or joined in another conventional manner.

After piston members 22 and cylinders 18 are mounted to the connecting arms and housing 24, and caps 71 are located in openings 50 and 68, the assembled running gear may be inverted 180 degrees about axis 90 and returned to the orientation for use shown in FIG. 1.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A running gear for a compressor, said running gear comprising:
   a) a split running gear housing comprising:
      i) a first unitary housing portion having a first wall and a second wall, each said wall having at least one shoulder and a first shroud formed in each said wall; and
      ii) a second unitary housing portion having a first wall and a second wall, each said wall of said second housing portion having a second shroud formed therein, said second housing portion adapted to be mated with said first housing portion, said first and second housing portions together defining a housing chamber, said first and second shrouds adapted to form a bearing carrier recess when the first and second housing portions are mated; and
   b) an integral crank assembly adapted to be located in the housing chamber, said crank assembly comprising:
      i) a shaft having a first shaft end and a second shaft end;
      ii) a first bearing member supported solely by a first bearing carrier mounted on the shaft between the shaft ends, the first bearing carrier completely surrounding the first bearing member, said first bearing carrier having at least one arm, each of the at least one arms adapted to be seated on one of the at least one shoulders formed in the first wall of the first housing portion;
      iii) a second bearing member supported solely by a second bearing carrier mounted on the shaft between the shaft ends, the second bearing carrier completely surrounding the second bearing member, said second bearing carrier having at least one arm adapted to be seated on one of the at least one shoulders formed in the second wall of the first housing portion, the first and second bearing carriers being located in the bearing carrier recesses so that no portion of the first and second bearing members is supported by the first and second housing portions.

2. The running gear as claimed in claim 1, wherein each said wall has two of said shoulders and each said bearing carrier has two of said arms.

3. The running gear as claimed in claim 2 wherein each said first shroud is U-shaped.

4. The running gear as claimed in claim 1 wherein each said first shroud has an L-shaped cross-section.

* * * * *